April 21, 1964 E. P. LARSH 3,129,591
BALANCING APPARATUS
Filed Aug. 11, 1960 3 Sheets-Sheet 1

INVENTOR
EVERETT P. LARSH
BY William R. Jacox
HIS ATTORNEY

April 21, 1964  E. P. LARSH  3,129,591
BALANCING APPARATUS
Filed Aug. 11, 1960  3 Sheets-Sheet 2
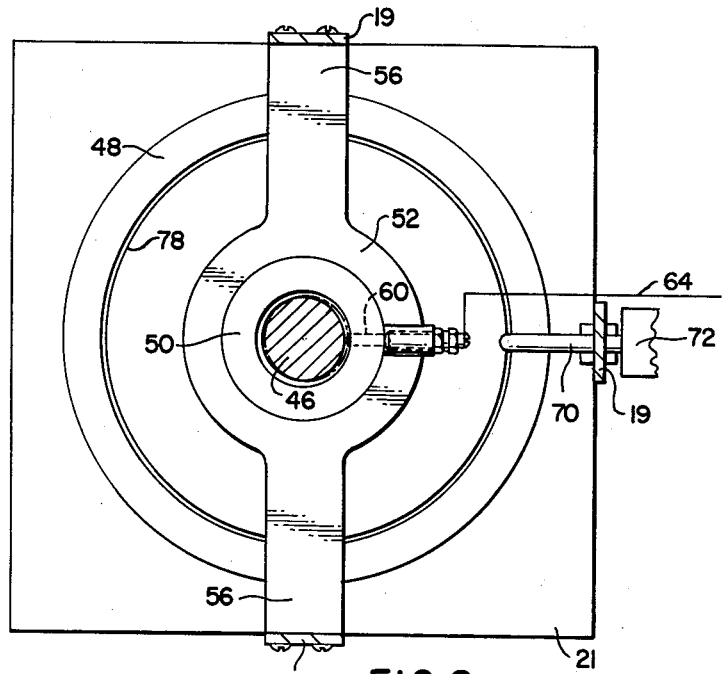
FIG. 2
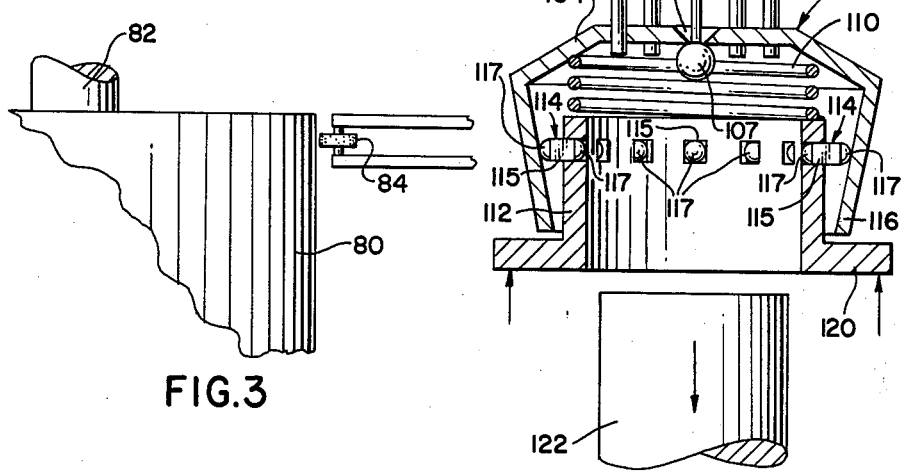
FIG. 3
FIG. 9
INVENTOR
EVERETT P. LARSH
BY William R Jacox
HIS ATTORNEY April 21, 1964    E. P. LARSH    3,129,591
BALANCING APPARATUS Filed Aug. 11, 1960    3 Sheets-Sheet 3

INVENTOR
EVERETT P. LARSH

BY *William R Jacox*

HIS ATTORNEY

United States Patent Office 3,129,591
Patented Apr. 21, 1964

3,129,591
BALANCING APPARATUS
Everett P. Larsh, Montgomery County, Ohio
(124 E. Monument Ave., Dayton 2, Ohio)
Filed Aug. 11, 1960, Ser. No. 48,902
8 Claims. (Cl. 73—472)

This invention relates to balancing apparatus. The invention relates more particularly to apparatus which is capable of automatically balancing a rotatable member during rotation thereof. However, the invention is not so limited in that the apparatus may be used for balancing operations which may not be considered as being automatic.

This invention relates to my inventions disclosed in Patent No. 2,937,613 and in application Serial No. 29,984, filed May 18, 1960.

In a balancing apparatus, a rotary motor is usually provided for rotation of a member or body or mass for the balancing thereof. Some type of coupling means connects the rotary motor to the member or body which is to be balanced. It is desirable to provide coupling means which does not transmit vibrational forces from the rotary motor to the member or body being balanced.

Thus, an object of this invention is to provide balancing apparatus which includes means for coupling a rotary driving motor to a member or body for the balancing thereof so that vibrational forces exterior of the member or body are not transmitted thereto during balancing thereof.

Another object of this invention is to provide such balancing apparatus which may be used in either automatically operating or in other types of balancing mechanisms.

Another object of this invention is to provide such balancing apparatus which is extremely accurate and rapid in operation.

Another object of this invention is to provide balancing apparatus which is capable of balancing any rotatable member by the addition of weight thereto or by the subtraction of weight therefrom during rotation thereof for balancing thereof.

Other objects and advantages reside in the construction of parts, the combination thereof, the method of manufacture, and the mode of operation, as will become more apparent from the following description.

In the drawings:

FIGURE 2 is a sectional view taken substantially on line 2—2 of FIGURE 1.

FIGURE 3 is a fragmentary elevational view showing a modification of a portion of the balancing apparatus of this invention.

FIGURE 9 is an enlarged sectional view, on a scale slightly smaller than FIGURES 7 and 8, of a portion of the apparatus as shown in FIGURE 4 but in another position of operation.

Figure 1:
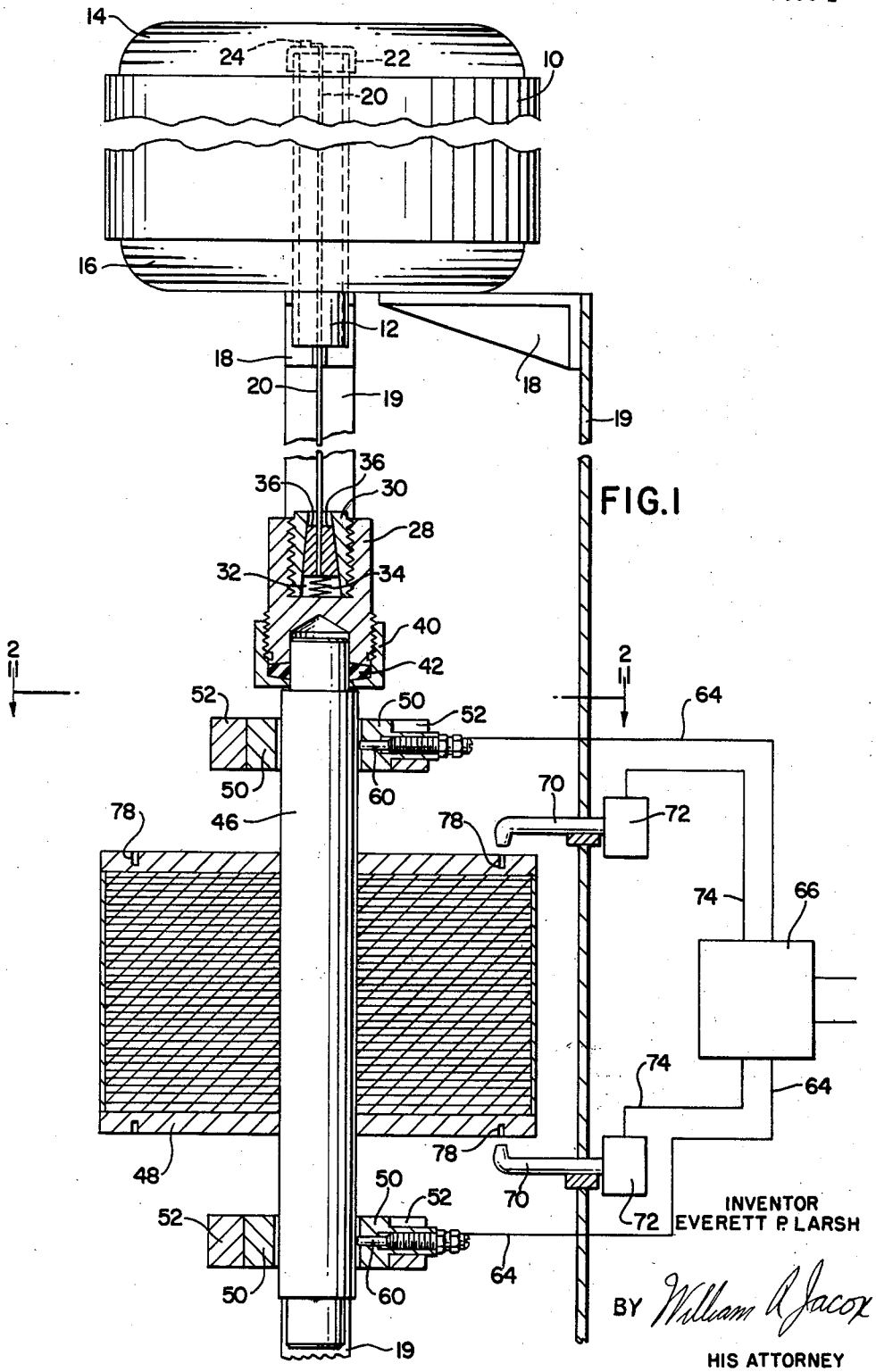
FIGURE 1 is a diagrammatic elevational view, with parts shown in section, of balancing apparatus of this invention.

Referring to the drawings in detail, balancing apparatus of this invention comprises any suitable rotary motor means. FIGURE 1 shows an electric motor 10 provided with a vertically disposed rotary shaft 12. The motor 10 has an upper end cover 14 and a lower end cover 16. The motor 10 is shown supported by mounting brackets 18. The mounting brackets 18 are carried by vertical leg members 19, which are carried by a base 21.

Means are provided for connection of a body or member for rotation of the body with the shaft 12.

An elongate member, such as a wire or wire-like member 20 or small diameter rod or the like, is attached to the shaft 12. The member 20 may be any suitable element or elements, flexible or rigid having the physical ability to transmit torque while also serving as a support. Herein, the shaft 12 is shown as being hollow with a cap 22 at the upper end thereof provided with an aperture at the center thereof through which the elongate member or wire 20 extends. The wire 20 is shown by reference numeral 24 as being attached to the upper surface of the cap 22. Thus, the wire 20 extends downwardly from the shaft 12 and is substantially coaxial therewith.

The lower end of the wire 20 is connected to any suitable coupler member. Herein a coupler member 28 is shown as having an adapter 30 threadedly recessed therein. The adapter 30 is provided with a socket 32 having a spring 34 which urges individual jaw members 36 outwardly therefrom. The jaw members 36 firmly engage the wire 20 and prevent movement of the wire 20 from the coupler 28.

Threadedly attached to the lower portion of the coupler 28 is a clamping member 40. A resilient ring 42 of rubber or rubber-like material is disposed between tapered surfaces of the coupler 28 and the clamping member 40. Thus, as the clamping member 40 is threadedly urged farther upon the coupler 28 inner portions of the resilient ring 42 are urged radially inwardly. Thus, the resilient ring 42 is used to firmly attach the clamping member 40 and the coupler 28 to a shaft 46 of a rotor 48 for the balancing of the rotor 48. Thus, the shaft 46 hangs vertically downwardly from the wire 20, as shown in FIGURE 1.

Therefore, with rotation of the shaft 12 of the motor 10, the rotor 48 is rotated. If the rotor 48 is dynamically out of balance, there is orbiting or lateral movement of the rotor 48 and the shaft 46 with rotation of the rotor 48. The amount of such lateral movement is reduced by bringing the rotor 48 into better dynamic balance. The length of the elongate member or wire is such that the rotor 48 is permitted to orbit freely in accordance with its out of balance condition without restraint by the wire 20 as the rotor 48 is rotated by the wire 20. Furthermore, due to the fact that the shaft 46 of the rotor 48 is connected to the rotary motor 10 only through the elongate member or wire 20, vibrational forces exterior of the rotor 48, from the motor 10 or from other sources, are not transmitted to the rotor 48. Thus, the wire 20 serves as means for rotation of the rotor 48 so that orbital movement of the rotor 48 is not restrained by the wire 20 and the rotor 48 is not affected by external forces other than rotational forces transmitted from the motor 10. The hollow shaft 12 permits suspension of the rotor 48 at a position disposed from the position of attachment of the wire 20 to the shaft 12 without the necessity for the rotor to be remotely positioned from the shaft 12.

If desired to limit the amount of lateral movement of the body 48 and the shaft 46 thereof, a ring 50 may encircle the shaft 46 adjacent each end thereof, as shown in FIGURE 1. Each ring 50 is encompassed by and attached to a yoke 52. Each yoke 52 has arm members 56 extending therefrom and secured to a vertical post member 19, as shown in FIGURE 2.

Each ring 50 has an inner diameter which is slightly larger than the diameter of the shaft 46. Thus, the shaft 46 has limited lateral movement within the rings 50. As shown in FIGURES 1 and 2, a contact stem or sensing member 60 is carried by each of the yokes 52 and extends through its respective ring 50 and into the central portion thereof. Thus, upon sufficient lateral or orbital movement of the shaft 46, as shown in broken lines in FIGURE 2, the shaft 46 engages one or both of the contact stems 60.

Electric conductor members 64 are connected to the contact stems 60 and extend therefrom to a control or indicator unit 66. Each momentary engagement of the shaft 46 with one or both of the contact stems 60 indicates or senses the momentary position of a heavier portion of the rotor 48. This sensing or indicating signal is transmitted to the control unit 66 through one or both of the conductor members 64. Therefore, in accordance with the disclosure in Patent No. 2,937,613, the control unit 66 may have connected thereto means for changing the weight of the rotor 48 during rotation thereof in accordance with signals provided by the sensing member 60.

Shown in FIGURES 1 and 2 are a pair of gun members or projectile members 70 each of which has an actuator 72 connected by means of a conductor 74 to the control unit 66. Therefore, during rotation of the rotor 48, the contact stems 60 sense or indicate the position of heavier portions of the rotor 48 and through the control unit or sensing unit 66, the gun members 70 are actuated at the proper instant of time to add weight to portions of the rotor 48 which are diametrically opposite the heavier portions thereof. Annular slots or grooves 78 may be provided in the rotor 48 to receive weight material discharged from the members 70. When the rotor 48 has been brought within a given degree of dynamic balance by adding weight thereto at the correct portions thereof, the shaft 46 remains substantially concentric with the ring members 50 during rotation of the shaft 46 and the shaft 46 does not engage the contact stems 60. Therefore, the balancing of the rotor 48 may be automatically carried out during rotation of the rotor 48.

If desired, means may be provided, as shown in FIGURE 3, for removing weight from the portions of a rotor during rotation thereof, as disclosed in said Patent No. 2,937,613. In some types of balancing operations, means such as the rings 50 for limiting lateral movement of the shaft 82, need not be used. Shown in FIGURE 3 is a rotor 80 having a shaft 82 which may be rotated by the mechanism shown in any of the other figures. Any suitable sensing means may be used for operation of a cutter or grinder wheel 84, shown in FIGURE 3, as disclosed in said Patent No. 2,937,613. Also, if so desired, the grinder wheel 84 may be continuously operating at a given position to remove portions of heavier sections of the rotor 80 which may engage the wheel 84 as the rotor 80 is freely rotated, as disclosed in said Application Serial No. 29,984.

Shown in FIGURES 4–9 is a modification of a balancing apparatus of this invention. These figures show another means for support of a rotor or body for the balancing thereof. A motor 90 is shown as being provided with a vertically disposed hollow shaft 92. Nonrotatably attached to the upper end of the shaft 92 is a cover 94 to which is pivotally attached a small diameter rod or wire 96 or the like. However, as stated with reference to the member 20, the member 96 may be any suitable elongate torque transmission member. The rod 96 has a ball 97 at the upper end thereof which rests upon the cover 94 as the rod 96 extends through a tapered opening 99 in the cover 94. Thus, the rod 96 is pivotally carried by the cover 94 but there is driving connection between the cover 94 and the rod 96. The cover 94 and the wire or rod 96 rotate with rotation of the shaft 92.

At the lower end of the shaft 92 and secured therewithin is a ring 98. The ring 98 has a comparatively large central opening 100 through which the wire 96 extends.

Connected to the lower end of the wire or rod 96 is any suitable coupler or coupling member or clamping member 102. The coupler is shown provided with a cap 104. Any suitable means is used to connect the coupler 102 to the wire or rod 96 so that the coupler 102 is movable angularly with respect to the rod 96 while being substantially nonrotatable with respect to the rod 96. The rod or wire 96 extends through tapered opening 105 in the cap 104 and has a ball 107 at the lower end thereof. Thus, the rod or wire 96 is pivotally connected to the cap 104.

Rigidly attached to the cap 104 and extending upwardly therefrom are a plurality of spaced-apart pin members 106. Each of the pin members 106 extends into an aperture 108 in the ring 98. Each aperture 108 is considerably larger than the pin 106 which is disposed therein.

Figure 8:
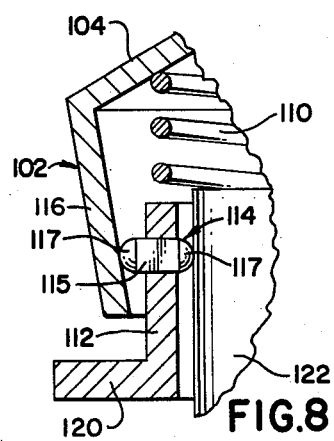
FIGURE 8 is an enlarged fragmentary sectional view of a portion of the apparatus as shown in FIGURE 4.
Figure 5:
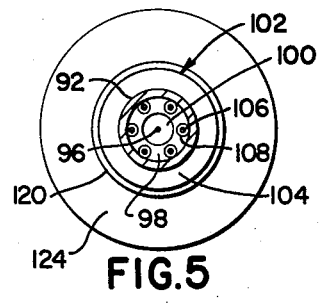
FIGURE 5 is a sectional view taken substantially on line 5—5 of FIGURE 4.
Figure 6:
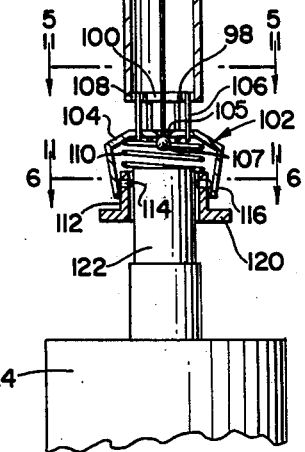
FIGURE 6 is a sectional view taken substantially on line 6—6 of FIGURE 4.
Figure 7:
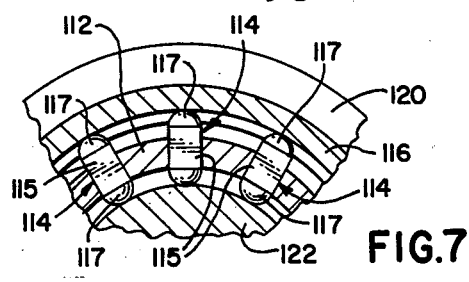
FIGURE 7 is an enlarged fragmentary sectional view of a portion of the apparatus as shown in FIGURE 6.

Within the cap member 104 and secured thereto at the upper portion thereof is a helical spring 110. The lower end of the spring 110 is attached to a connector or cylinder 112 which extends into the cap 104. The spring 110 urges the connector 112 in a direction from the cap 104. The cylinder 112 has a plurality of engagement members 114 disposed in annular arrangement and slidably retained in square or rectangular radial apertures in the wall thereof. Each engagement member 114 is thus radially movable. Each of the engagement members 114 has a central body portion 115 which is rectangular in cross section and arcuate end portions 117, as best shown in FIGURE 8. Thus, each engagement member 114 is is nonrotatable with respect to the wall of the cylinder 112.

The cap 104 has a lower portion 116 which has an internal inwardly inclined surface with which each of the engagement members 114 is in contact. The lower end of the cylinder 112 is shown as being provided with a flange 120.

Figure 4:
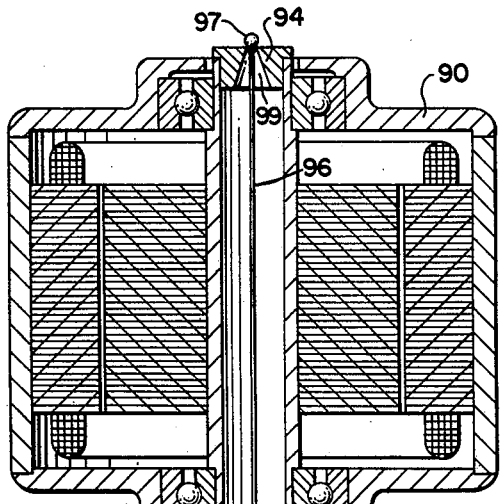
FIGURE 4 is a sectional view showing another modification of a portion of the balancing apparatus of this invention.

As best shown in FIGURE 4, a shaft 122 of a rotor 124 is supported by the coupler 102. The shaft 122 extends into the cylinder 112 and the engagement members 114 are in firm contact with the shaft 122. The weight of the shaft 122 and the rotor 124 cause the cylinder 112 to be urged downwardly. Downward movement of the cylinder 112 within the cap 104 causes the lower portion 116 of the cap 104 to urge the engagement members 114 radially inwardly toward the shaft 122. Thus, the shaft 122 is firmly clamped and supported by the coupler 102.

The pin members 106 loosely disposed within the apertures 108 of the ring 98 and firmly attached to the cap 104 provide means for transmission of torque from the shaft 92 to the clamping member 102 during acceleration and deceleration of the shaft 92. Due to the fact that the pin members 106 are freely movable within the apertures 108, torque transmission at operational speeds occurs through the wire or rod member 96. The pin members 106 permit angular movement of the shaft 122 with respect to the shaft 92 which occurs during rotation of the rotor 124 when the rotor 124 is out of balance.

For attachment of the shaft 122 to the coupler 102 the rotor 124 is lifted upwardly so that the shaft 122 is forced into the cap 104 through the cylinder 112. Then, the lifting forces applied to the rotor 124 are released so that the spring 110 can move the cylinder 112 downwardly causing the engagement members 114 to clamp the shaft 122. Thus, the weight of the rotor 124 is carried by the coupler 102.

As shown in FIGURE 9, when it is desired to release the shaft 122 from the coupler 102 all that is necessary is to force upwardly upon the flange 120 so that the engagement members have less pressure upon the shaft 122.

Thus it is understood, that this invention provides connection and support means between a driving motor and a rotating body for the balancing of the body. The connection and support means is capable of free rotation of the body to be balanced without transferring any external forces to such body except rotational forces.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. Apparatus for dynamically balancing a rotatable member comprising a motor provided with a vertically disposed hollow rotatable drive shaft which extends through the motor, a wire attached to the upper end of the shaft at the center thereof and extending downwardly through the shaft and suspended below the shaft, the wire being connected to the shaft for rotation therewith, and coupler means connected to the lower end of the wire and to the rotatable member so that the coupler means rotates with rotation of the wire as the wire rotates with rotation of the shaft, the coupler means thus being freely suspended at the lower end of the wire for movement at a distance from the upper end of the motor drive shaft which distance is equal to the length of the wire while the coupler means is suspended at a distance from the motor which is less than the length of the wire.

2. In balancing apparatus, motor means having a vertical hollow rotatable drive shaft which extends through the motor means, an elongate small diameter rod within the shaft substantially coaxial therewith and pivotally connected to the upper portion of the shaft and rotatable with the shaft, the rod extending from the shaft at the lower end thereof, coupler means attached to the rod at the lower end thereof for rotation therewith, the coupler means including means for connection to a body for support thereof and for rotation thereof with rotation of the rod, the coupler means thus being freely suspended for movement at a distance from the upper portion of the shaft which distance is equal to the length of the rod while the coupler means is suspended at a distance from the motor means which is less than the length of the rod.

3. In rotary apparatus, a vertically disposed rotatable shaft, a coupler disposed below the shaft and adjacent thereto, flexible means attached to the shaft and supporting the coupler, and rigid means attached to the coupler and engageable with the shaft for rotation of the coupler with the shaft, the coupler including means for attachment to a body for support thereof and for rotation thereof.

4. Rotary apparatus comprising a rotatable vertical shaft, at least the lower portion of the shaft being hollow, a wire-like member carried by the shaft therewithin substantially coaxial therewith and extending downwardly therefrom, the wire-like member being rotatable with the shaft, a coupler attached to the lower end of the wire-like member, rigid means loosely connecting the coupler to the shaft so that the coupler is rotated by the shaft through the rigid means, the coupler including means for attachment to a body for support thereof and for rotation thereof.

5. In rotary apparatus, a vertical shaft, a ring attached to the shaft at the lower end thereof, a wire-like member carried by the shaft and freely extending through the ring and suspended below the shaft, a coupling member disposed below the shaft adjacent the ring and attached to the wire-like member, a plurality of pin members attached to the coupling member and extending upwardly therefrom, the ring having a plurality of apertures therein, each pin member extending into one of the apertures, each aperture being considerably larger than its respective pin member, the coupling member including means for attachment to a body for support thereof and for rotation thereof.

6. In balancing apparatus, a hollow vertical shaft, a wire-like member within the shaft and extending downwardly substantially coaxial therewith and rotatable therewith, a ring within the shaft at the lower end thereof and attached thereto, the wire-like member extending through said ring and downwardly from the shaft, a coupler member disposed below the shaft and attached to the wire-like member for support thereby, a plurality of pin members attached to the coupler member and extending upwardly therefrom, the ring having a plurality of apertures therethrough, one of said pin members extending into each of said apertures, each aperture being considerably larger than the pin member which extends therewithin, the coupler member having means for attachment to a body for support thereof and for rotation thereby.

7. Rotary mechanism comprising a carrier member rotatable about a vertical axis, a flexible shaft-like support member carried by the carrier member for rotation therewith and having a portion suspended downwardly therefrom substantially coaxial therewith, an alignment member supported by the carrier member at the lower end thereof and provided with a plurality of apertures therein, a coupler attached to the support member and disposed below the carrier member adjacent thereto, the coupler including a cap member, a plurality of pin members attached to the cap member and extending upwardly therefrom, each of the pin members being loosely disposed in one of the apertures of said alignment member, the cap member having an annular inwardly inclined lower wall forming an opening at the bottom thereof, a clamping member extending into the cap member through the opening thereof, the clamping member having a plurality of radially movable engagement members, the clamping member having an opening therein adapted to receive a portion of a body for support thereof, each of the engagement members having a portion in engagement with the inclined wall of the cap member and also having a portion within the opening of the clamping member for engagement with said portion of a body therewithin.

8. Rotary mechanism comprising a rotatable vertically disposed hollow shaft, a wire-like member supported by the shaft at the upper portion thereof and disposed within the shaft substantially coaxial therewith, the wire-like member also extending below the shaft, the shaft having a ring therein and attached thereto adjacent the lower end thereof, the wire-like member extending freely through said ring, the ring having a plurality of apertures therein, a coupler member disposed below the shaft and attached to the wire-like member for support thereby, the coupler member including a cap member, a plurality of pin members rigidly attached to the cap member and extending upwardly therefrom, each pin member extending into one of the apertures of the ring, the cap member having an internal inwardly inclined wall forming an opening at the lower end thereof, a hollow cylinder extending through the opening and substantially coaxial with the wire-like member, the cylinder being partially disposed within the cap member and reciprocally movable therein, a helical spring within the cap member attached to the upper portion thereof and attached to the cylinder, the helical spring urging the cylinder in a direction from the cap member, the cylinder having a wall portion within the cap member provided with a plurality of radial holes therethrough, a plurality of engagement members, there being one engagement member movably carried by the cylinder within each of the holes, each engagement member having a portion on the outside of the cylinder, such engagement member having a portion inside the cylinder, the portion of each engagement member which is outside of the cylinder being in contact with the inclined wall of the cap member, the cylinder being adapted to receive a portion of a body therewithin, the body being clamped by the engagement members as the engagement members are forced toward the axis of the cylinder by the inclined wall of the cap member, the coupler member thus supporting the body for rotation thereof.

References Cited in the file of this patent

UNITED STATES PATENTS

| | | |
|---|---|---|
| 922,561 | Callan | May 25, 1909 |
| 1,533,044 | Smith | Apr. 7, 1925 |
| 2,838,266 | Rees | June 10, 1958 |
| 2,937,613 | Larsh | May 24, 1960 |
| 2,970,844 | Better | Feb. 7, 1961 |

FOREIGN PATENTS

| | | |
|---|---|---|
| 651,556 | Great Britain | Apr. 4, 1951 |